(12) United States Patent
Hicks

(10) Patent No.: US 8,876,143 B1
(45) Date of Patent: Nov. 4, 2014

(54) LOCKING MECHANISM FOR TRAILER HITCH

(76) Inventor: Craig Hicks, Placentia, CA (US)

( * ) Notice: Subject to any disclaimer, the term of this patent is extended or adjusted under 35 U.S.C. 154(b) by 724 days.

(21) Appl. No.: 12/980,219

(22) Filed: Dec. 28, 2010

Related U.S. Application Data

(60) Provisional application No. 61/290,454, filed on Dec. 28, 2009.

(51) Int. Cl.
*B60D 1/14* (2006.01)

(52) U.S. Cl.
USPC .......................... 280/507; 280/511; 280/504

(58) Field of Classification Search
USPC ........................................ 280/507, 511, 504
See application file for complete search history.

(56) References Cited

U.S. PATENT DOCUMENTS

| D255,540 | S | * | 6/1980 | Baylis ............................ D8/331 |
| 4,577,884 | A | * | 3/1986 | Harris ............................ 280/507 |
| 4,794,769 | A | * | 1/1989 | Persons ............................ 70/232 |
| 5,131,796 | A | * | 7/1992 | Herum et al. .................. 411/222 |
| 5,280,941 | A | * | 1/1994 | Guhlin ............................ 280/507 |
| 5,743,548 | A | * | 4/1998 | Gaspard ......................... 280/507 |
| 5,873,271 | A | * | 2/1999 | Smith ................................ 70/58 |
| 6,203,050 | B1 | | 3/2001 | Stech |
| 6,695,557 | B2 | * | 2/2004 | Hove et al. ..................... 411/429 |
| 6,846,002 | B2 | * | 1/2005 | Irgens et al. .................... 280/507 |
| 7,392,674 | B1 | * | 7/2008 | Grote ............................... 70/232 |

* cited by examiner

*Primary Examiner* — Kevin Hurley
*Assistant Examiner* — Michael Stabley
(74) *Attorney, Agent, or Firm* — Knobbe Martens Olson & Bear LLP

(57) ABSTRACT

A nut member having a groove is used to replace the existing nut that holds a ball mount for a trailer to the mounting location. A sleeve is positioned over the nut member and a locking mechanism in the sleeve is engaged so that a locking arm is positioned within the groove of the nut member thereby inhibiting removal of the sleeve when the lock is engaged. Access to the nut member is inhibited by being enclosed by the sleeve.

23 Claims, 3 Drawing Sheets

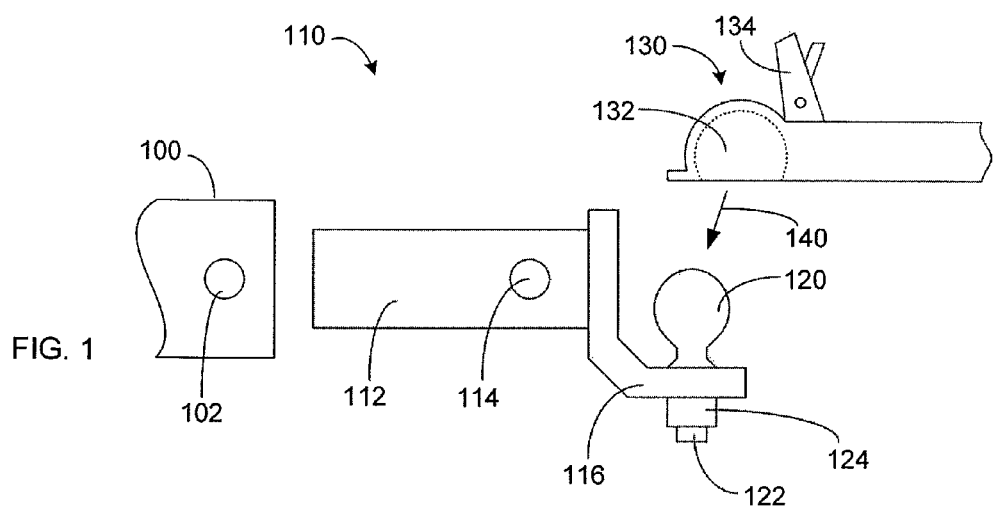
FIG. 1
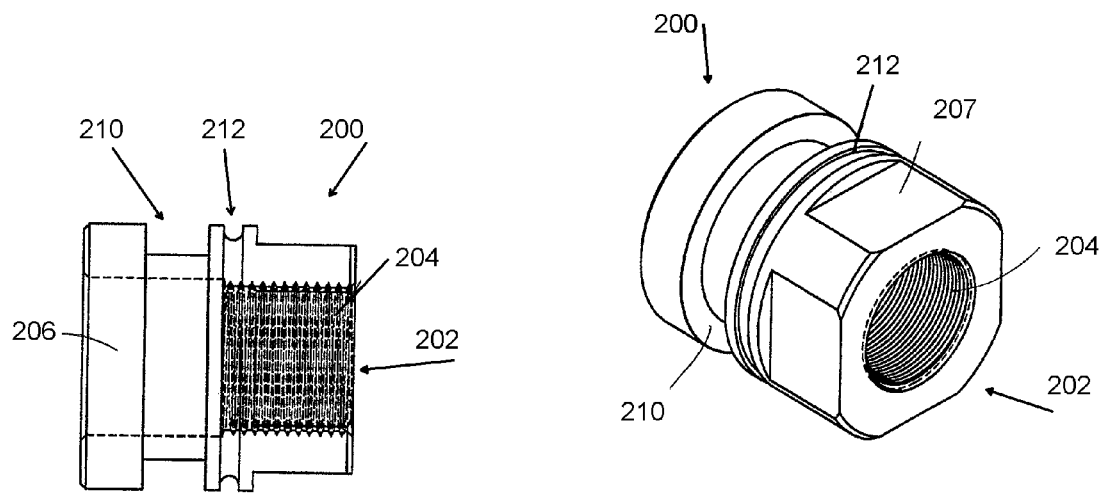
FIG. 2A
FIG. 2B

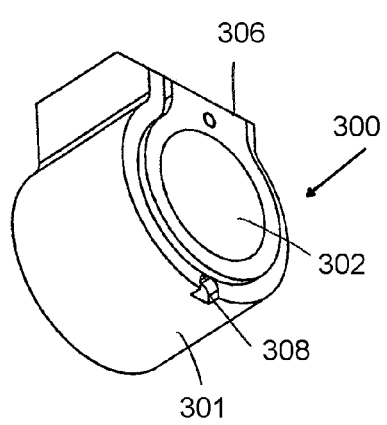
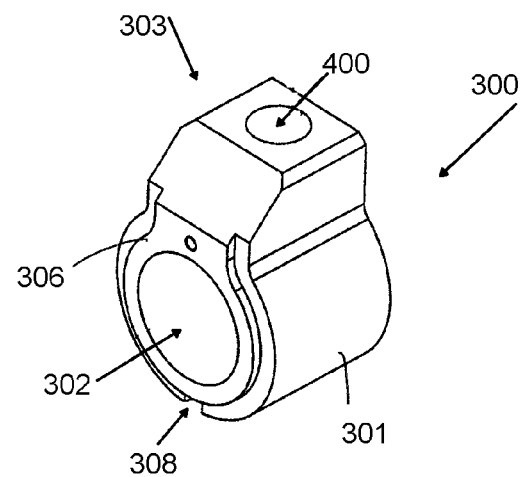
FIG. 3A
FIG. 3B

LOCKING MECHANISM FOR TRAILER HITCH

CROSS-REFERENCE TO RELATED APPLICATIONS

This application claims the benefit of U.S. Provisional Application No. 61/290,454 filed Dec. 28, 2009 entitled LOCKING MECHANISM FOR TRAILER HITCH which is hereby incorporated by reference in its entirety.

BACKGROUND OF THE INVENTION

1. Field of the Invention

The present invention relates to trailer components and, in particular, concerns a mechanism and method for preventing unauthorized removal of a trailer hitch ball from a trailer hitch assembly.

2. Description of the Related Art

Trailers are commonly towed by personal vehicles such as cars, sports utility vehicles and pickup trucks. Typically, a trailer hitch is coupled to the vehicle. The trailer hitch can either be an insert that is positioned within a receiver attached to the vehicle or a hitch ball that is coupled to the bumper or other surface of the vehicle. The trailer has a tongue portion that includes a ball receiver that is positioned over the ball and secured thereto by a clamping mechanism.

To prevent the unauthorized removal of the trailer from the vehicle, various security devices are employed. In one implementation, the trailer hitch assembly comprises a receiver that receives a drawbar that has the hitch ball positioned thereon. A lock mechanism is often secured through the receiver and the drawbar to ensure that the drawbar cannot be removed from the receiver without disengagement of the lock mechanism. Similarly, a locking pin can also be engaged with the clamping mechanism that secures the ball receiver to the ball to prevent the ball receiver from being removed from the ball without disengagement of the locking pin.

Both of these devices work satisfactorily in preventing the hitch drawbar from being removed from the receiver or in preventing the ball receiver from being removed from the ball. However, in many implementations, the ball can be easily removed from the draw bar or bumper thereby disconnecting the trailer from the vehicle which allows the trailer to be potentially stolen.

More specifically, the ball is typically attached to the drawbar or vehicle mounting surface via a threaded shank that is welded to or is otherwise attached to the ball. The threaded shank extends through a hole in the drawbar or vehicle mounting location and a nut is then threaded onto the shank to secure the ball to the drawbar or vehicle mounting location. By removing this nut, the trailer can be detached from the tow vehicle as the ball, which is captured in the trailer's ball receiver can be removed from the drawbar or vehicle mounting location. The above-mentioned securing devices do not address this potential source of unauthorized detachment of the trailer from the tow vehicle as they are directed towards preventing unauthorized removal of the drawbar from the receiver or unauthorized removal of the ball from the ball receiver.

There have been several devices that have been developed to address the issue of unauthorized removal of the ball from the drawbar or vehicle mounting location. One example is shown in U.S. Pat. No. 6,203,050 to Stech. In this implementation, a hole is drilled through the threaded shank and a lock is then secured to the shank, below the nut inhibiting removal of the hut. This type of locking mechanism requires a longer shank and the lock is exposed which can allow a potential thief to use a sledgehammer, crowbar or the like to break the lock off of the shaft. Further, drilling holes in the hardened metal of a bolt shank is also very difficult. Another product on the market has two downwardly extending flanges that are positioned closely about the nut so that a wrench cannot be used to unscrew the nut. A socket is then generally used to screw on and unscrew the nut. While this system is relatively effective in preventing removal of the ball when the ball is coupled with a ball receiver of a trailer, the ball can be removed by unscrewing when it is exposed. Thus, this system is relatively ineffective in preventing theft of the ball assembly which is also a problem faced by owners of vehicles that have ball assemblies attached to the vehicles.

From the foregoing, it will be apparent that there is a need for an improved device for inhibiting the removal of a trailer ball from a drawbar or other mounting location. To this end, there is a need for an ability to protect access to the securing feature of the trailer ball to its place of mounting via a locking mechanism.

SUMMARY OF THE INVENTION

As described herein, the present disclosure can relate to an apparatus for a trailer hitch, where the apparatus includes a first member defining a threaded opening dimensioned to receive a shank extending from a hitch ball. The shank defines a substantially matching thread pattern such that rotation of the first member with respect to the shank extending through a portion of a drawbar results in the hitch ball being mounted to the drawbar. The first member further defines one or more tool-engaging surfaces to facilitate installation or removal of the first member to or from the shank. The apparatus further includes a second member configured to be removably installed to the first member. The second member defines an opening dimensioned to receive and cover at least a portion of the first member such that when the second member is installed to the first member, the second member inhibits access of the one or more tool-engaging surfaces by a tool sufficiently to inhibit removal of the first member from the shank. The apparatus further includes a first coupling mechanism configured to releasably retain the second member installed to the first member. The coupling mechanism can be further configured such that the second member is allowed to rotate sufficiently freely about the shank and with respect to the first member such that rotation of the second member does not result in rotation of the first member when the first member is installed to the shank.

In certain embodiments, the one or more tool-engaging surfaces are dimensioned to engage a wrench. In certain embodiments, the first member comprises a nut for mounting the hitch ball to the drawbar. In certain embodiments, the opening on the second member is dimensioned to define a substantially cylindrical opening. In certain embodiments, outer dimensions of the first member are selected such that the first member substantially fits into the cylindrical opening of the second member.

In certain embodiments, the coupling mechanism includes a groove defined on an outer surface of the first member, with the groove extending circumferentially about the first member's longitudinal axis. The coupling mechanism further includes a retaining member mounted to the second surface so as to allow extension of at least a portion of the retaining member into at least a portion of the groove to retain the second member installed to the first member. The retaining member can be retractable from its extended position so as to allow removal of the second member from the first member.

The retaining member can be dimensioned such that the portion of the retaining member within the groove is allowed to move circumferentially relative to the first member.

In certain embodiments, the groove extends the entire circumference of the first member. In certain embodiments, the retaining member comprises a pin actuated by an actuating mechanism. In certain embodiments, the actuating mechanism comprises a locking mechanism.

In certain embodiments, the apparatus further includes a second coupling mechanism configured such that when the second member is positioned to be installed to the first member but not retained by the first coupling mechanism, the second coupling mechanism inhibits the second member from falling away from the first member. In certain embodiments, the second coupling mechanism may include either an O-ring or a magnet disposed on one of the first and second members, with the magnet or O-ring providing sufficient retaining force to the other of the first and second members to inhibit the falling away of the second member.

The present disclosure can also relate to a nut for securing a hitch ball and shank assembly to a drawbar. The nut includes an elongate body dimensioned to fit into a separate sleeve, with the elongate body having a longitudinal axis and having first and second ends. The elongate body defines a substantially cylindrical shaped opening extending substantially parallel to the longitudinal axis from the first end towards the second end, with at least a portion of the cylindrical opening being dimensioned and threaded to substantially match threads on the shank to allow installation or removal of the nut to or from the shank by application of torque to the elongate body. The nut also includes a tool-engaging surface formed on the elongate body to facilitate application of the torque. The nut also includes a groove defined on an outer surface of the elongate body, with the groove extending circumferentially about the longitudinal axis. The groove can be dimensioned to receive a pin extending inward from the sleeve and allow retaining of the sleeve. The groove can allow the sleeve to rotate relative to the elongate body without causing rotation of the elongate body.

In certain embodiments, the cylindrical opening extends from the first end to the second end so as to define an open aperture.

In certain embodiments, the nut can be a replacement nut for an existing nut. In certain embodiments a kit having such a nut can be provided as a kit.

BRIEF DESCRIPTION OF THE DRAWINGS

FIG. 1 is a schematic illustration of a typical trailer hitch assembly having a drawbar positioned within a receiver mounted to a vehicle, wherein the drawbar includes a ball, and a trailer tongue having a ball receiver for securing the trailer to the vehicle;

FIGS. 2A and 2B are cross-section and perspective views of a nut member that is used with the trailer hitch assembly of FIG. 1;

FIGS. 3A and 3B are perspective views of a sleeve member that engages with the nut member to secure the ball to the trailer tongue or mounting location.

DETAILED DESCRIPTION OF THE PREFERRED EMBODIMENT

Figure 4:
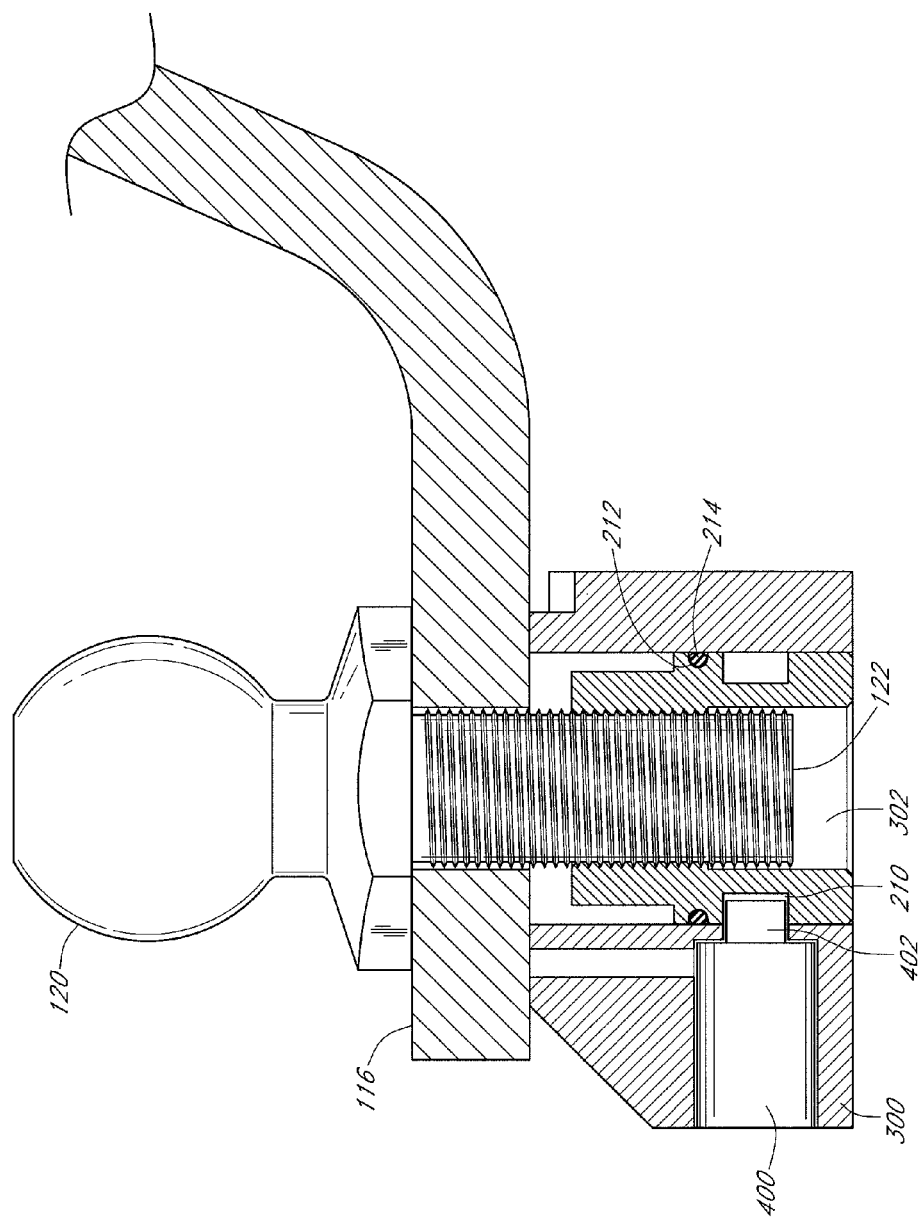
FIG. 4 is a cross-sectional view illustrating the engagement between the nut member, the sleeve member and the ball assembly.

Various aspects, advantages, and novel features of the present teachings will become apparent upon reading the following description and upon reference to the accompanying drawings. In the drawings, similar elements have similar reference numerals.

FIG. 1 shows a typical hitching configuration 110, where a drawbar 112 is typically mounted in a receiver 100 and secured by a retaining pin (not shown) extending through matching holes 102 and 114. Typically, the receiver 100 is mounted to a towing vehicle (not shown) in a known manner. The drawbar 112 typically includes a hitch ball mounting portion 116 dimensioned to position a hitch ball 120 at a desired height. The mounting portion 116 can be a drop-down type (as shown), a straight extension, or a raised type to accommodate different vehicles and vehicle configurations.

Typically, the hitch ball 120 is securely connected to a shank 122 that extends through a hole defined by the mounting portion 116. A mounting nut 124 engages with the shank 122; and tightening of the nut 124 mounts the ball 120 to the mounting portion 116. While FIG. 1 illustrates the hitch ball 120 being mounted to a mounting portion 116 defined by a drawbar 112, it will be appreciated that the hitch ball 120 can be mounted in any of a number of different ways without departing from the spirit of the present invention. For example, the hitch ball 120 can be mounted to a bumper of a vehicle or mounted to any of a number of other different locations in a vehicle without departing from the spirit of the present invention.

In FIG. 1, a tongue portion 130 of a trailer (not shown) is shown to be positioned (arrow 140) such that a ball-receiver 132 receives the ball 120. The ball 120 is typically inhibited from escaping the ball-receiver 132 via a clamping lever 134 that reduces the dimension of the ball-receiver 132.

FIGS. 2A and 2B illustrate a nut member 200 that is configured to replace the existing nut 124 on an existing ball mount assembly. As shown, the nut member 200 defines a central shaft 202 that extends through the nut member 200. The central shaft 202 includes a threaded portion 204 and an unthreaded portion 206. The threaded portion 204 extends about one half of the length of the central shaft 202. The threaded portion 204 is configured to match the threads of the shank 122 and can be tightened against the bottom surface of the mounting portion 116 to secure the ball 120 to the mounting portion 116 in the same manner as previously accomplished with the nut 124. As shown in FIG. 2B, the outer surfaces 207 of the threaded portion 204 of the nut member 200 may be configured to receive a socket or wrench to facilitate tightening of the nut member 200 onto the shank 122.

As is also shown in FIGS. 2A and 2B, the outer surface of the member 200 is further configured to define a first circumferential O-ring groove 212 that receive an O-ring 214. As will be described in greater detail below, the O-ring 214 engages with a covering sleeve 300 to retain the sleeve 300 in position on the nut member 200 prior to engagement of a locking assembly 400. The outer surface 200 also defines a circumferential locking groove 210 that receives a lock member of the locking assembly 400 contained within the sleeve 300 in the manner that will be described in greater detail below. It will be appreciated that the exact configuration of the nut member 200 may vary depending upon the application without departing from the spirit of the present invention. For example, the nut member 200 in one implementation does not include the O-ring groove 212 or the O-ring 214.

FIGS. 3A and 3B illustrate a sleeve 300 that engages with the nut member 200 so as to inhibit removal of the nut member 200 from the shank 122. The sleeve 300 has a cylindrical portion 301 that defines an interior shaft 302 which is sized so as to be slightly larger than the outer diameter of the nut member 202 adjacent the O-ring groove 212. The sleeve 300 further includes a locking portion 303 that extends outward form a surface of the cylindrical portion 301 and contains a locking assembly 400 that engages with the locking groove 210 on the nut member 200 so as to retain the sleeve 300 on the nut member 200 in the manner that will be described in greater detail hereinbelow.

The interior shaft 302 of the sleeve 300 is preferably sized so as to be larger than the overall length of the nut member 200 so that when the nut member 200 is positioned within the sleeve 300, the nut member 200 is entirely covered by the sleeve 300. In this way, access to the nut member 200 to articles such as crowbars, sledgehammers etc. are inhibited.

The cylindrical portion 301 of the sleeve 300 may be configured so as to engage with a plurality of different ball mounts. For example, as shown in FIGS. 3A and 3B, an upper surface 304 of the sleeve 300 may be contoured so as to include a raised surface 306 that surrounds the interior shaft 302. The raised portion 306 is configured to engage with a ball mount manufactured by Reese Inc. of Burnsville Minn. where the area of the mounting portion 116 that surrounds the nut member 200 is countersunk. Further, a recess 308 can also be included to accommodate a pin that is included in a ball mount manufactured by Master lock Inc. of Milwaukee, Wis. It will be appreciated that any of a number of different variations and changes to the configuration of the top surface 304 may be made to accommodate the different configurations of the ball mounts or mounting locations. The objective is to ensure that the sleeve 300 is positioned in contact with the mounting location 116 so that a thief would not be able to insert a tool between the mounting portion 116 and the sleeve 300.

As discussed above, the O-ring 214 frictionally engages with the interior surface of the shaft 302 of the sleeve 300. This engagement performs two functions. First, the engagement inhibits rotation of the sleeve 300 about the nut member 200. Second, this engagement allows a user to insert the sleeve 300 over the nut member 200 and retain the sleeve 300 in the correct orientation prior to engagement of the locking mechanism 400. Thus, the user can install the sleeve 300 and engage the locking mechanism to lock the sleeve 300 to the nut member 200 without the sleeve falling off during the locking procedure.

FIG. 3B illustrates the location of the locking mechanism 400 on the locking portion 303 of the sleeve 300. In one specific embodiment, the locking mechanism 400 is a key operated cylinder projection lock that has a locking arm 402 that engages with the groove 210 of the nut member 200 in the manner shown in FIG. 4. Preferably, the length of the lock arm 402 is less than the depth of the groove 210 so that the sleeve 300 is not prevented from rotating around the nut member 200 by the engagement of the lock arm 402 and the inner surface of the groove 210. The frictional engagement between the O-ring 214 and the sleeve 300 inhibits rotation but does not prevent rotation. It will be understood that allowing some level of rotation prevents force from being transferred from the sleeve 300 to the nut member 200 and thereby prevents a person from attempting to unscrew the nut member 200 by rotating the sleeve 300.

A user who wishes to make use of the nut member 200 and sleeve 300 to provide additional security to their trailer would first remove the existing nut 124 that holds the ball mount 120 to the mounting surface. The nut member 200 is then screwed onto the shank 122 of the ball mount 120 until the nut member 200 is positioned proximate the underside of the mounting portion 116. The user then slides the sleeve 300 over the nut member 200 so that the nut member 200 is substantially contained within the cylindrical shaft 302 of the sleeve 300. The user then manipulates the lock mechanism 400 so that the locking arm 402 is positioned within the circumferential locking groove 210 of the nut member 200.

The sleeve 300 is preferably made of metal, such as steel or billet aluminum and has sufficient thickness that sleeve 300 is difficult to break with a sledgehammer or the like. In one specific example, the sleeve 300 is made of 6061 T6 Aluminum that is ½" thick. Similarly, the nut member 200 must also be made of a rugged material such as 1045 carbon steel, a grade 5 steel.

It will be appreciated that the nut member 200 and sleeve 300 can be used in a variety of different applications. Essentially, any protrusion that is used to couple to a trailer, whether it is a ball or some other device can be secured in this manner. Further, while the above-embodiments have illustrated the nut member 200 and sleeve 300 being used in conjunction with a trailer hitch having a drawbar and receiver, this assembly can be used to secure a trailer connecting member to any surface of a vehicle.

It will be appreciated that the foregoing description has shown, illustrated and described embodiments of the present invention. It will be appreciated however that various changes to the form, the implementation or the method of use of the present invention could be made by those skilled in the art without departing from the spirit of the present invention. Hence, the scope of the present invention should not be limited to the foregoing discussion but should be defined by the appended claims.

What is claimed is:

1. An apparatus for a trailer hitch, the apparatus comprising:
    a first member defining a threaded opening dimensioned to receive a shank extending from a hitch ball, the shank defining a substantially matching thread pattern such that rotation of the first member with respect to the shank extending through a portion of a drawbar results in the hitch ball being mounted to the drawbar, the first member further defining one or more tool-engaging surfaces to facilitate installation or removal of the first member to or from the shank;
    a second member removably installed to the first member, the second member defining an opening dimensioned to receive and cover at least a portion of the first member such that when the second member is installed to the first member, the second member inhibits access of the one or more tool-engaging surfaces by a tool sufficiently to inhibit removal of the first member from the shank; and
    a first coupling mechanism releasably retaining the second member installed to the first member, such that when the coupling mechanism couples the second member to the first member, the second member is allowed to rotate about the shank and with respect to the first member such that rotation of the second member does not result in rotation of the first member when the first member is installed to the shank.

2. The apparatus of claim 1, wherein the one or more tool-engaging surfaces are dimensioned to engage a wrench.

3. The apparatus of claim 1, wherein the first member comprises a nut for mounting the hitch ball to the drawbar.

4. The apparatus of claim 1, wherein the opening on the second member is dimensioned to define a substantially cylindrical opening.

5. The apparatus of claim 4, wherein outer dimensions of the first member are selected such that the first member substantially fits into the cylindrical opening of the second member.

6. The apparatus of claim 1, wherein the coupling mechanism comprises:
   a groove defined on an outer surface of the first member, the groove extending circumferentially about the first member's longitudinal axis; and
   a retaining member mounted to the second member so as to allow extension of at least a portion of the retaining member into at least a portion of the groove to retain the second member installed to the first member, the retaining member retractable from its extended position so as to allow removal of the second member from the first member, the retaining member dimensioned such that the portion of the retaining member within the groove is allowed to move circumferentially relative to the first member.

7. The apparatus of claim 6, wherein the groove extends the entire circumference of the first member.

8. The apparatus of claim 6, wherein the retaining member comprises a pin actuated by an actuating mechanism.

9. The apparatus of claim 8, wherein the actuating mechanism comprises a locking mechanism.

10. The apparatus of claim 1, further comprising a second coupling mechanism configured such that when the second member is positioned to be installed to the first member but not retained by the first coupling mechanism, the second coupling mechanism inhibits the second member from falling away from the first member.

11. The apparatus of claim 10, wherein the second coupling mechanism comprises a magnet disposed on one of the first and second members, the magnet providing sufficient retaining force to the other of the first and second members to inhibit the falling away of the second member.

12. A nut for securing a hitch ball and shank assembly to a drawbar, the nut comprising:
    an elongate body dimensioned to fit into a separate sleeve, the elongate body having a longitudinal axis and having first and second ends, the elongate body defining a substantially cylindrical shaped opening extending substantially parallel to the longitudinal axis from the first end towards the second end, at least a portion of the cylindrical opening dimensioned and threaded to substantially match threads on the shank to allow installation or removal of the nut to or from the shank by application of torque to the elongate body;
    a tool-engaging surface formed on the elongate body to facilitate application of the torque; and
    a groove defined on an outer surface of the elongate body, the groove extending circumferentially about the longitudinal axis, the groove dimensioned to receive a pin extending inward from the sleeve and allow retaining of the sleeve, the groove allowing the sleeve to rotate relative to the elongate body without causing rotation of the elongate body.

13. The nut of claim 12, wherein the cylindrical opening extends from the first end to the second end so as to define an open aperture.

14. The nut of claim 12, wherein the nut comprises a replacement nut for an existing nut.

15. A kit comprising the nut of claim 12.

16. A securing assembly for a trailer hitch mounting member having a shank that couples the trailer hitch mounting member to a mounting location, the mechanism comprising:
    a nut member that engages with the shank of the trailer hitch mounting member at the mounting location of the trailer hitch mounting member wherein the nut member includes at least one securing opening;
    a sleeve member defining an interior aperture that is sized so as to receive the nut member therein so that the nut member is at least partially enclosed within the aperture; and
    a locking mechanism having a lock member positioned within the sleeve member, wherein the locking mechanism in a locked configuration positions the lock member into the securing opening so that the sleeve is inhibited from being removed from the nut member and an unlocked configuration wherein the sleeve can be removed from the nut member.

17. The assembly of claim 16, wherein the at least one securing opening comprises a circumferential groove that is sized so as to receive the lock member and retain the sleeve member on the nut member but permit rotation therebetween.

18. The assembly of claim 17, further comprising a frictional engagement member that is interposed between the nut member and the sleeve so as to retain the nut member and sleeve together prior to engagement of the locking mechanism into the first orientation.

19. The assembly of claim 18, wherein the frictional engagement member comprises an O-ring.

20. The assembly of claim 16, wherein the sleeve member defines a first surface that is contoured so as to engage with the mounting location of the trailer hitch mounting member.

21. The assembly of claim 20, wherein the first surface includes a raised portion adjacent the aperture and a notch.

22. The assembly of claim 16, wherein the trailer hitch mounting member comprises a ball mount.

23. The apparatus of claim 10, wherein the second coupling mechanism comprises an O-ring that is interposed between the first and second member so as to retain the second member on the first member via frictional engagement.

* * * * *